(12) United States Patent
Swamy et al.

(10) Patent No.: US 7,227,330 B2
(45) Date of Patent: Jun. 5, 2007

(54) OVERVOLTAGE SUPPRESSION TECHNIQUE FOR VARIABLE FREQUENCY DRIVES OPERATING RECIPROCATING LOADS

(75) Inventors: Mahesh M. Swamy, Gurnee, IL (US); Brian Geoffrey, New Berlin, WI (US); Yoshiaki Yukihira, Buffalo Grove, IL (US); Mike Rucinski, Kenosha, WI (US)

(73) Assignee: Yaskawa Electric America, Inc., Waukegan, IL (US)

( * ) Notice: Subject to any disclaimer, the term of this patent is extended or adjusted under 35 U.S.C. 154(b) by 1 day.

(21) Appl. No.: 11/181,544

(22) Filed: Jul. 14, 2005

(65) Prior Publication Data

US 2007/0013338 A1    Jan. 18, 2007

(51) Int. Cl.
*H02P 23/00* (2006.01)
*B66B 1/28* (2006.01)

(52) U.S. Cl. ............... 318/798; 318/700; 318/801; 187/296

(58) Field of Classification Search ........... 318/798, 318/700, 801; 322/28, 29; 363/174; 700/44
See application file for complete search history.

(56) References Cited

U.S. PATENT DOCUMENTS

| | | | | |
|---|---|---|---|---|
| 3,225,179 A | * | 12/1965 | Chestnut et al. | 700/44 |
| 3,593,103 A | * | 7/1971 | Chandler et al. | 363/174 |
| 3,829,758 A | * | 8/1974 | Studtmann | 322/28 |
| 3,860,858 A | * | 1/1975 | Nola | 318/801 |
| 4,401,938 A | * | 8/1983 | Cronin | 322/29 |
| 4,483,419 A | * | 11/1984 | Salihi et al. | 187/296 |
| 4,501,343 A | * | 2/1985 | Salihi | 187/296 |
| 4,509,004 A | * | 4/1985 | Shepard, Jr. | 318/801 |
| 4,713,595 A | * | 12/1987 | Yonemoto | 318/759 |
| 5,480,220 A | * | 1/1996 | Kumar | 303/151 |
| 6,313,600 B1 | * | 11/2001 | Hammond et al. | 318/798 |
| 6,414,455 B1 | | 7/2002 | Watson | |
| 6,429,612 B1 | | 8/2002 | Kume et al. | |
| 6,448,735 B1 | * | 9/2002 | Gokhale et al. | 318/700 |
| 6,741,059 B2 | * | 5/2004 | Gokhale et al. | 318/700 |

OTHER PUBLICATIONS

Yaskawa "For Varispeed-600 Series Inverter Braking Unit Braking Resistor Unit Instructions"—Manual No. TOE-C726-2D.
Yaskawa Varispeed 67 Instruction Manual No. TOE-S616-60.1B, Feb. 2003.
Technical Guide No. 1—Direct Torque Control—26.04.2002, Jul. 2000.

* cited by examiner

*Primary Examiner*—Paul Ip
(74) *Attorney, Agent, or Firm*—Wood, Phillips, Katz, Clark & Mortimer

(57) ABSTRACT

A motor control for a reciprocating load includes overvoltage suppression. The motor control comprises a variable frequency drive (VFD) operatively connected to a power source for operating a motor to drive the reciprocating load. A sensor determines motor torque. A control unit is connected to the VFD and to the sensor and is adapted to control the VFD in a normal mode to operate the motor at a select reference frequency. The control unit predicts occurrence of a negative motor torque condition based on sensed motor torque and in response to a negative motor torque condition controls the VFD in a negative motor torque mode to operate the motor at a higher frequency than the select reference frequency to prevent the motor from entering a negative slip condition.

18 Claims, 4 Drawing Sheets

OVERVOLTAGE SUPPRESSION TECHNIQUE FOR VARIABLE FREQUENCY DRIVES OPERATING RECIPROCATING LOADS

FIELD OF THE INVENTION

This invention relates to variable frequency drives and, more particularly, to an overvoltage suppression technique for a variable frequency drive operating a reciprocating load.

BACKGROUND OF THE INVENTION

A motor drive system, in one known form, comprises an AC source supplying three-phase AC power to a variable frequency drive (VFD). The VFD includes an AC/DC converter connected by a DC link or bus to a DC/AC converter. The DC/AC converter may comprise a pulse width modulated inverter using insulated GATE bipolar transistors (IGBTs).

Many industrial applications use reciprocating loads that are driven by VFDs. In most of such applications, during certain portion of one complete load cycle, the load tends to accelerate the motor at speeds higher than that commanded by the VFD. This is referred to as "overhauling". Under such a condition, the inverter is required to absorb the regenerated energy. Typically, this is achieved by providing braking resistor and transistor units know as 'braking units'. The braking units are sized according to the duty cycle and stored regenerative energy in the load. Sometimes, multiple braking units may need to be employed in a master-slave manner to accommodate large amounts of regenerated energy. Use of braking units, while accepted in the industry, suffer from high costs, require large space to mount, and are inherently inefficient since the regenerated energy is dissipated as heat in the braking resistors.

Alternative methods that can handle overhauling load without the use of external brake resistors have been considered. Some of the methods include high slip braking, disabling or reducing torque component of current during overhauling, and increasing output frequency based on DC bus voltage.

Kume et al., U.S. Pat. No. 6,429,612, assigned to the assignee of the present application, discloses high slip braking. This patent relates to bringing a rotating load to a stop, rather than to absorb the regenerated energy during overhauling and continue operating in the motoring mode in the next part of the cycle.

Another technique that has been adopted in the industry for handling an overhauling type load reduces the torque-generating component of the output current during regeneration to zero. In other words, the motor is operated at approximately zero slip. Operation at zero slip yields zero regenerated torque and thus the motor is prevented from converting the mechanical energy into electrical energy. This has been implemented in high performance inverters. However, this requires an inverter capable of operating in a closed loop vector control manner that can track the actual speed of the motor and maintain operation at zero slip throughout the regenerative part and come out of this mode once this part of the cycle is complete. Such inverters need sophisticated control algorithms operating on dedicated DSP chips.

Another alternative method currently being used in the oil industry is described in Watson, U.S. Pat. No. 6,414,455. The '455 patent discusses three modes of operating a variable speed drive to handle overhauling type loads. The three modes are "TM" mode or constant torque mode, "BSM" mode or base speed mode, and "DM" mode or dual mode. In the TM mode, the speed is allowed to change in order to maintain a certain torque reference. In the BSM mode, the torque is allowed to change within the lower and upper torque limits in order to maintain the desired set speed. In the DM mode, the controller is fed with two speed reference values (Fref) and two torque reference values (Tref). The user then has the choice to either select one of the speed reference values or one of the torque reference values. The basis of the control philosophy is to limit the torque provided by the inverter to the motor during the upstroke part of the cyclic load. Doing this reduces or eliminates regenerative torque being produced during the down-stroke, thereby increasing the overall system efficiency, and reducing the size and cost of the inverter, since the inverter does not need the braking resistor unit. Some drawbacks of this method are that there is need for a DC bus voltage sensor and a DC bus current sensor. Most inverters do not have DC current sensors at the correct position and rely on the DC current flowing into the capacitor, which flows only when the capacitor voltage has gone lower than the instantaneous value of the input AC voltage and hence does not truly mirror the instantaneous torque profile of the load. Further, DC voltage across the DC bus capacitor is a parameter that changes very slowly and cannot be relied upon to take corrective action since it would be too late to act upon it. If the torque reference is maintained at a value needed for motoring action and is not changed during regenerative action, such a control philosophy will fail to limit the magnitude of the regenerated energy and this can cause a rise in DC bus voltage and eventually put the inverter in a fault state.

The present invention is directed to solving one or more of the problems discussed above.

SUMMARY OF THE INVENTION

In accordance with the invention, there is provided an overvoltage suppression technique for a variable frequency drive operating a reciprocating load.

There is disclosed in accordance with one aspect of the invention a control method for overvoltage suppression of a variable frequency drive (VFD) operating a motor to drive a reciprocating load, comprising: controlling the VFD to operate the motor at a select reference frequency; predicting occurrence of a negative motor torque condition; and in response to a predicted negative torque condition controlling the VFD to operate the motor at a higher frequency than the select reference frequency.

It is a feature of the invention that controlling the VFD to operate the motor at a higher frequency than the select reference frequency comprises continually incrementally increasing an output frequency as long as negative torque condition is predicted.

It is another feature of the invention that predicting occurrence of a negative motor torque condition comprises determining if motor torque has a negative slope and motor torque is less than a select torque reference amount.

It is still another feature of the invention that magnitude of the higher frequency is dependent on value of negative slope.

It is yet another feature of the invention to determine if the higher frequency is greater than a maximum frequency and in response thereto providing a shutdown condition.

There is disclosed in accordance with another aspect of the invention a control for overvoltage suppression of a variable frequency drive (VFD) operating a motor to drive a reciprocating load. The control comprises a control unit adapted to control the VFD in a normal mode to operate the motor at a select reference frequency. The control unit controls the VFD in a negative motor torque mode to operate the motor at a higher frequency than the select reference frequency, whereby the control unit prevents the motor from entering a negative slip condition.

There is disclosed in accordance with yet another aspect of the invention a motor control for a reciprocating load and including overvoltage suppression. The motor control comprises a variable frequency drive (VFD) operatively connected to a power source for operating a motor to drive the reciprocating load. Means are provided for determining motor torque. A control unit is connected to the VFD and to the determining means and is adapted to control the VFD in a normal mode to operate the motor at a select reference frequency. The control unit predicts occurrence of a negative motor torque condition based on sensed motor torque and in response to a negative motor torque condition controls the VFD in a negative motor torque mode to operate the motor at a higher frequency than the select reference frequency to prevent the motor from entering a negative slip condition.

Further features and advantages of the invention will be readily apparent from the specification and from the drawings.

DETAILED DESCRIPTION OF THE INVENTION

Figure 1:
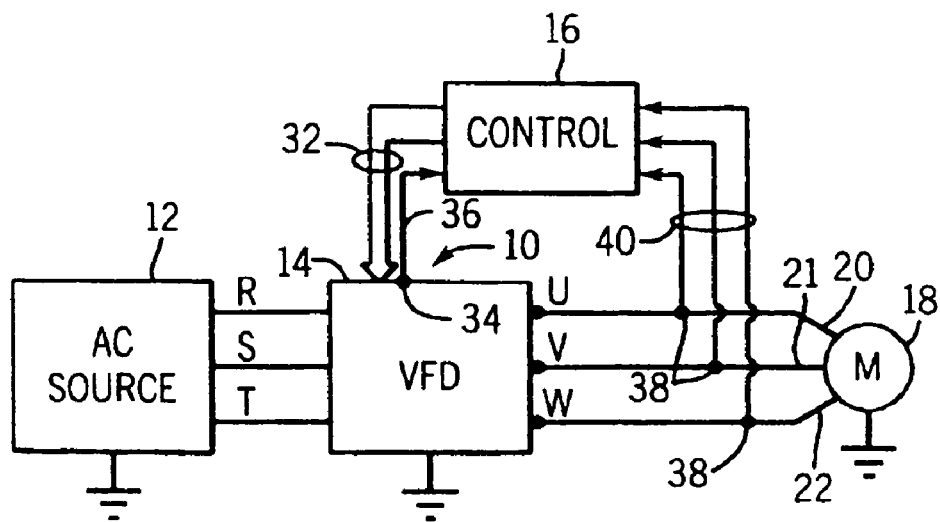
FIG. 1 is a generalized block diagram of a motor drive system including a control for a reciprocating load and including overvoltage suppression in accordance with the invention.

Referring initially to FIG. 1, a motor drive system 10 is illustrated. The motor drive system includes an AC source 12, a variable frequency drive (VFD) 14 and a control unit, or simply control, 16 for driving an induction motor 18. The AC source may comprise a drive or the like developing three-phase AC power on feeder conductors labeled R, S and T. The AC source 12 is grounded. The VFD 14, as described more particularly below, converts the AC power from the feeder conductors R, S and T, to DC power and converts it back to AC power at a select frequency which is then impressed across terminals U, V and W. The terminals U, V and W are connected to three (3) feeder conductors 20, 21 and 22 to drive the motor 18.

Figure 2:
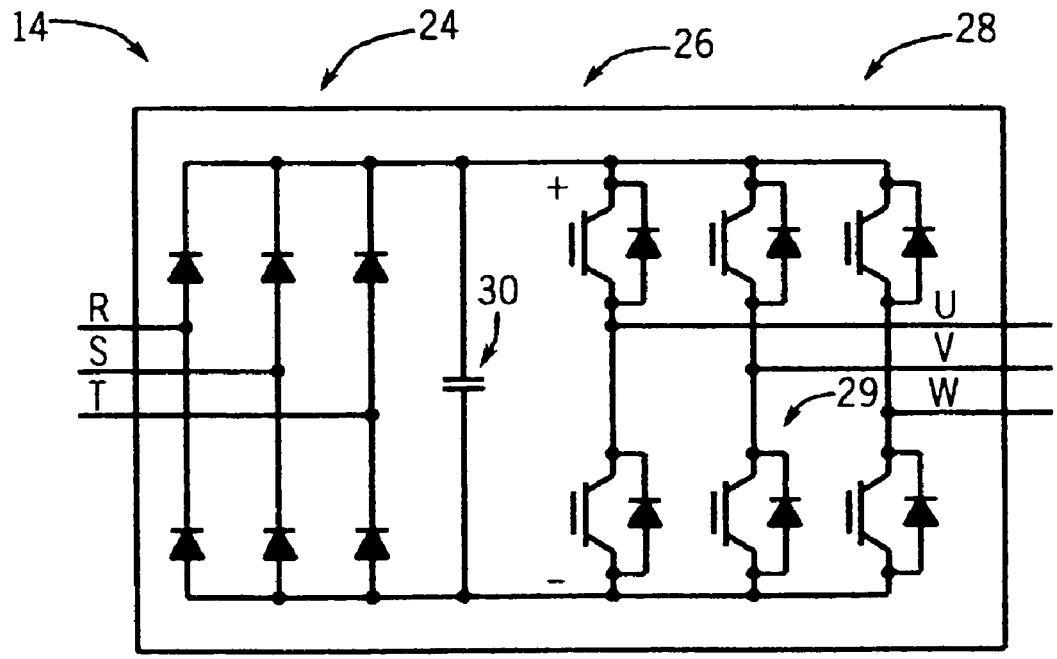
FIG. 2 is a schematic diagram of a variable frequency drive of the system of FIG. 1.

Referring to FIG. 2, a schematic diagram illustrates a typical circuit implementation for the VFD 14. The VFD 14 includes an AC/DC converter 24 connected by a DC bus 26 to a DC/AC converter 28. Particularly, according to the illustrated embodiment of the invention, the AC/DC converter 24 comprises a full wave bridge rectifier circuit of conventional construction which is operable to convert three-phase AC power to DC power. The DC bus 26 includes a conventional filter 30. The DC bus 26 has rails labeled "+" and "−". The DC/AC converter 28 comprises an inverter section. Particularly, the inverter section 28 comprises a pulse width modulation (PWM) inverter, using insulated GATE bipolar transistors (IGBTs) 29. The six (6) IGBTs 29 are connected in a three-phase bridge configuration to the DC Bus 26 to develop power at the terminals U, V and W. The IGBTs 29 are pulsed width modulated by signals on lines 32 from the control 16, see FIG. 1, using a conventional control scheme. Particularly, the PWM inverter 28 is controlled to create a sinusoidal effect for the induction motor 18. The pulse frequency used is fixed. The pulse width is varied to varied sinusoidal frequency.

Referring back to FIG. 1, the control 16 senses various parameters used in controlling the IGBTs 29 via signals on the line 32. Some of the sensed parameters are conventional, but not discussed herein as they do not relate to the overvoltage suppression technique disclosed herein. A voltage sensor 34 senses DC bus voltage and is connected via a line 36 to the control 16. Current sensors 38 sense current on each of the conductors 20, 21 and 22 and are likewise connected to the control 16 via lines 40.

The control 16 is advantageously a programmed processing system operating in accordance with a control program. As is apparent, the control 16 is operable to pulse width modulate the IGBTs to vary sinusoidal frequency to control speed of the motor. The techniques for doing so are well-known and are not discussed herein. The present invention relates particularly to a control algorithm for a reciprocating load and including overvoltage suppression.

Most variable frequency drives are capable of operating an induction motor in two or more control modes. The most widely accepted control mode for pumps is the volts/Hertz method. In this method, the output voltage being applied to the induction motor is closely associated with the output operating frequency. A linear relationship between the output voltage and output frequency results in constant torque operation, while a pre-programmed non-linear relationship may be employed to optimize the power consumption by the load — such non-linear relationship results in variable torque operation. The motor can also be operated in yet another control mode known as vector control mode of operation. This method is used for systems requiring higher level of performance that include high torque at low speed and the ability to maintain the commanded speed within the torque rating of the inverter motor combination, especially at very low speeds. In the present application, the inverter is operating in either the volts/Hertz mode, or the vector control mode.

The described technique for a reciprocating load and including overvoltage suppression is unique in the sense that it takes the stored energy in the load and uses it in the motoring portion of the load cycle. One advantage is that there is no need to use braking units, which translates to lower system and maintenance cost. Another advantage is that it makes the entire system more efficient since most of the stored energy is recovered and used up in the motoring portion of the load cycle. Typical applications that would benefit from this idea would be vibration tables, reciprocating pumps, presses, hammers, and beam pumps also known in the oil industry as pump-jacks. However, the idea is not restricted for use with only such loads and can be extended to include all types of loads that are cyclic in nature that have an overhauling characteristic in one portion of a load cycle and a motoring characteristic in the remaining portion of the load cycle. The following example illustrates the type of application that will benefit from the proposed concept.

Figure 3:
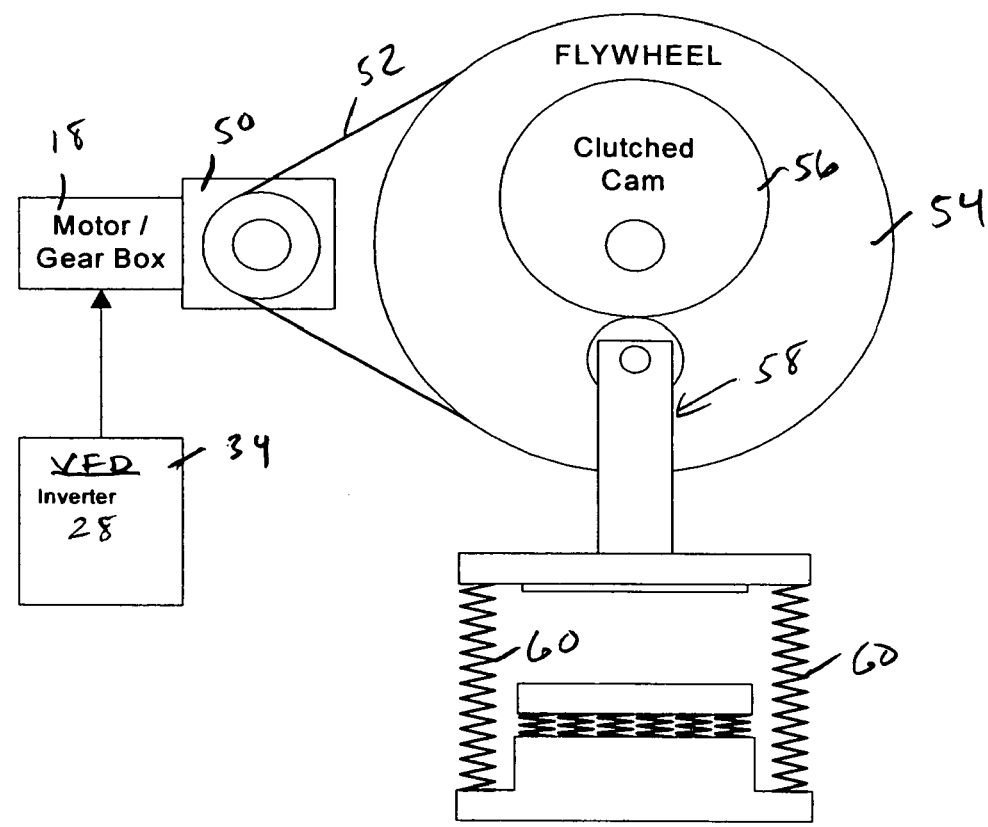
FIG. 3 is a schematic of a vibrating table application that exhibits regenerating mode in part of its operating cycle.

FIG. 3 illustrates an exemplary application for a reciprocating load. This system comprises the VFD 34, with the inverter 28, controlling the motor 18 that drives a gear box 50. As is apparent other control elements are omitted from this drawing. A pulley 52 driven by the gear box 50 drives a flywheel 54 having a clutched cam 56. The clutched cam 56 is in engagement with a cam follower 58 effectively biased with springs 60.

This exemplary application demonstrates two ways that the motor 18 may be forced into regeneration. The first is when a cam clutch (not shown) is not engaged. The motor 18 can accelerate and drive the flywheel 54. There is no problem until the speed of the motor 18 is reduced. The inertia from the flywheel 54 will overhaul the motor 18 forcing regeneration into the inverter 34. The second is when the cam clutch is engaged. The motor 18 will drive the flywheel 54 for one-half of a revolution compressing the springs 60. After the highest point of the cam 56 moves past the center of the cam follower 58 the springs 60 will begin to release stored energy into the flywheel 54 for the next half of a revolution. This can overhaul the motor 18 forcing regeneration into the inverter 28.

Figure 4:
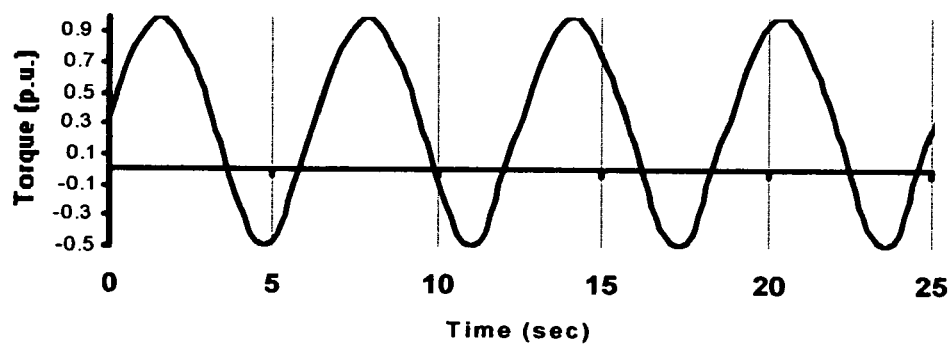
FIG. 4 is a typical torque profile observed in beam pump application.

A typical load torque curve for a reciprocating load is shown in FIG. 4. The positive part of the load torque indicates motoring action while the negative part indicates an overhauling condition during which the load tends to move faster than the commanded speed. Such a situation occurs often, for example, during the downward stroke in beam pumps. The bucket and arm comes down quickly due to gravity during the downward stroke and this causes the motor shaft to rotate faster than that commanded by the inverter.

During the downward stroke, the regenerated energy has to be given an outlet. In conventional VFDs, this energy is dissipated as heat in the braking unit. If no braking unit is provided, the VFD will experience an overvoltage condition and fault out thereby relinquishing control of the beam pump.

Figure 5:
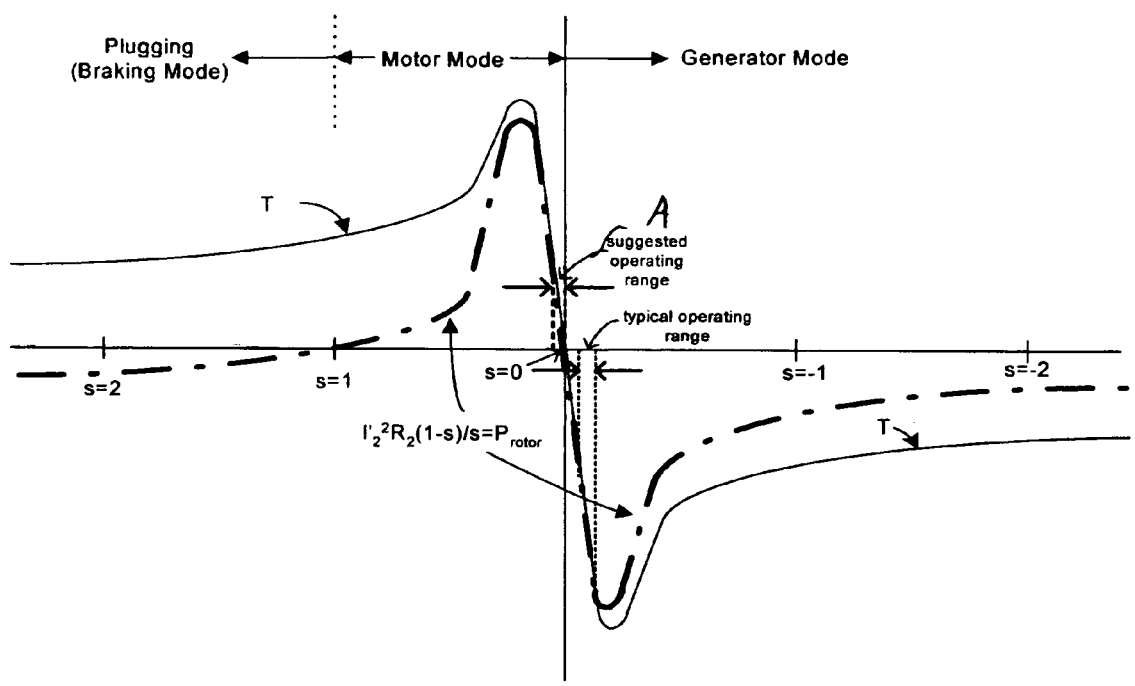
FIG. 5 is a graph illustrating Torque vs. slip and rotor power $P_{rotor}$ vs. slip for a typical induction motor.

The reason for overvoltage is the fact that the motor enters into a negative slip operation and functions as an induction generator. Part of the regenerated energy is consumed by friction in the load and some of it is dissipated as heat in the copper and iron losses in the motor. The remaining energy is rectified by the free wheeling diodes in the inverter section of the VFD and charges up the DC bus capacitor. If there is no means to handle the returned energy in the capacitor banks, the inverter will experience an overvoltage and exhibit a fault condition. Typically braking units are employed to dissipate this energy. The operating point of the motor under this condition is shown in FIG. 5 on a typical motor performance curve. In the described technique, the operating point of the motor is manipulated so that it does not behave like an induction generator. In other words, the motor is prevented from converting the stored mechanical energy into electrical energy. If this conversion process is halted or severely diminished then there exists no necessity to dissipate the regenerated energy. One way of achieving this is to operate the motor at or near zero slip condition but in the positive slip region as marked at region A in FIG. 5.

In order to achieve the operating range as suggested in FIG. 5, it is necessary to sense the instant of time where the torque is going negative and change the commanded frequency to catch-up with the increasing rotor speed so that the commanded frequency is always higher than or close to the rotor speed. This will prevent the motor from entering the negative slip mode (generator mode) of operation.

The invention comprises a method to predict the occurrence of the negative torque-condition and in response thereto to increase the commanded frequency to catch up with the free falling or overhauling load. The rate at which the commanded frequency changes and the maximum absolute value of the commanded frequency are all determined either in the field or by having a prior knowledge of the system.

In the illustrated embodiment of the invention output current is constantly monitored using current sensors 38. Known control concepts are used to extract the torque component ($I_q$) and the flux component ($I_d$) on a continuous basis for vector control operation. Hence, the torque component in the output current is readily available and is constantly monitored in the control 16 and if the slope is negative then a determination is made as to the time instant when the commanded frequency needs to be increased. The magnitude of the increase in the output commanded frequency and the instant at which it should take effect are dependent on the value of the negative slope. A higher negative slope requires a quicker and higher increase in the commanded frequency. The algorithm for implementing this method is illustrated in the flow diagram of FIG. 6, which describes a control program implemented in the control 16.

Figure 6:
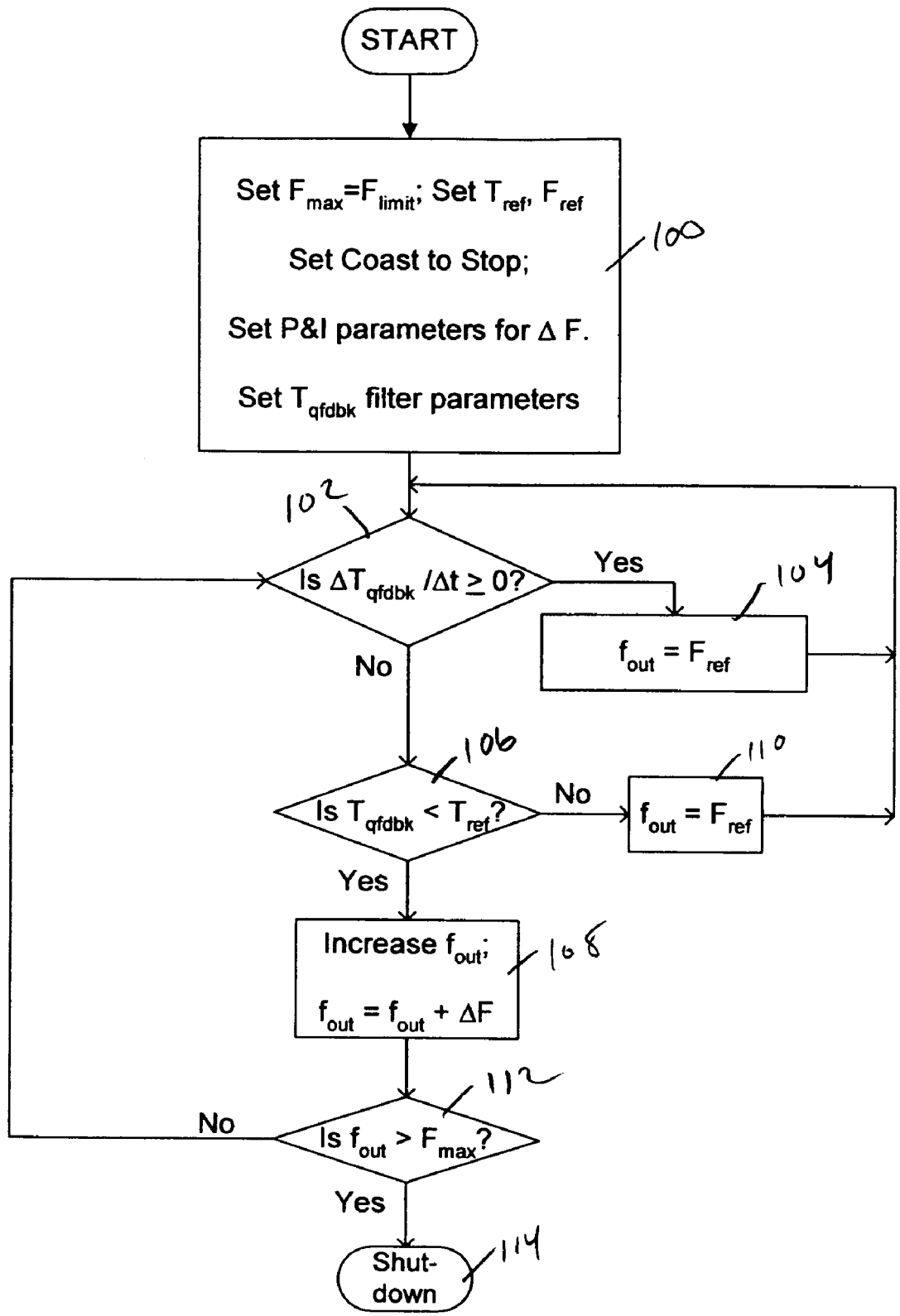
FIG. 6 is a flow diagram for the proposed technique to handle overhauling loads.

In FIG. 6, it should be noted that if the new commanded output frequency is greater than the maximum limit of the inverter then such a high overhauling (inertial) load cannot be accommodated by that particular inverter and one may have to go to a next higher rating of the inverter or choose to add an optimized amount of braking resistor across the inverter DC bus to absorb the excess regenerated energy.

As described above, the over-voltage suppression method may employ either the V/F control method or the vector control method. It is assumed that a motor with a large inertial load is operating with a load torque profile shown in FIG. 4. It is required that the motor-drive combination work without causing an over-voltage trip condition.

The control program begins at an initialization block 100. The system and method requires presetting certain parameters before initiating motor start. A maximum output frequency $F_{max}$ is set to a frequency limit of operation $F_{limit}$ dictated by the application and the capability of the system to handle high speeds. Also, a desired reference operating frequency, $F_{ref}$ is set. The decelerated stopping method should be disabled so the control 16 relies only on the coasting method to stop the entire system if and when needed. A reference torque level $T_{ref}$ needed to predict the occurrence of decreasing torque is selected. The torque sensing involves filtering the torque signal and conventional filter parameters should also be set at this time. When a decreasing torque value is encountered, then the algorithm will increase frequency to keep the motor from going into regeneration mode. An amount of incremental increase in the frequency $\Delta F$ is also set at the block 100.

Thereafter, an overhauling part of the cycle is identified at a decision block 102. This is determined by calculating the slope of the filtered torque feedback signal, $T_{qfdbk}$. As discussed above, the torque feedback signal $T_{qfdbk}$ comprises the torque component in the output current sensed by the current sensors 38. If the slope is negative, see FIG. 5, then the overhauling part of the cycle has commenced. If this condition is not met, then an output operating frequency $f_{out}$ is set back to $F_{ref}$ at a block 104 and the algorithm loops around the decision block 102. This is a "normal" mode of operation. The algorithm calculates the slope again in its next scan cycle through the decision block 102.

The output operating frequency f"out" is used to command operation in the control unit 16. Particularly, the control unit 16 is operated in a conventional manner to control output voltage applied to the induction motor 18, the output voltage being closely associated with the output operating frequency, as discussed above.

If the overhauling part of the cycle is identified at the block 102, then a check is made at a decision block 106 to see if the absolute value of the filtered torque feedback signal $T_{qfdbk}$ is lower than the reference torque level, $T_{ref}$. This is done to determine if motor torque is in the suggested operating range A, see FIG. 5. The objective is to prevent negative slip operation. If the filtered torque feedback signal $T_{qfdbk}$ is lower than the reference torque level, $T_{ref}$ then the algorithm advances to a block 108. Otherwise, the output operating frequency $f_{out}$ is set back to $F_{ref}$ at a block 110 and the algorithm loops around the decision block 102. This loop can last many scan cycles until both the conditions of negative torque slope, at the decision block 102, and large overhauling torque are such that the total torque indicated by $T_{qfdbk}$ is lower than $T_{ref}$ are met at the decision block 106.

At the block 108, the control unit 16 has predicted a negative motor torque condition. Particularly, the motor 18 is about to go into the regeneration mode. In order to reduce its impact, the control unit 16 enters a "negative motor torque" mode to operate the motor at a higher frequency than the select reference frequency $F_{ref}$, whereby the control unit 16 prevents the motor 18 from entering a negative slip condition. This is accomplished by commanding an incremental increase in the output operating frequency $f_{out}$. The increase amount is the preset level of $\Delta f$ frequency. After the frequency jump is commanded, the algorithm proceeds to a decision block 112 to determine if the output operating frequency $f_{out}$ exceeds the maximum frequency $F_{max}$ allowed for that application. If it does, then the system exits from this algorithm and the inverter unit may experience an over-voltage condition and enter into a fault state at a shutdown node 114. This indicates that a change in settings is needed to alleviate the problem. If the resulting frequency is less than the maximum allowable frequency for that application, then the algorithm returns back to the decision block 102 to assess the situation in the next cycle and continue this process until the motor 18 exits this part of the cycle and goes into the purely motoring mode. With the above method, the motor/load combination will not cause the inverter 28 to trip out with an over-voltage fault.

Thus, there is described a control method for overvoltage suppression of a VFD 14 operating a motor 18 to drive a reciprocating load 54, comprising controlling the VFD to operate the motor at a select reference frequency, predicting occurrence of a negative motor torque condition, and in response to a predicted negative torque condition controlling the VFD to operate the motor at a higher frequency than the select reference frequency. This method may be implemented in a control unit 16 adapted to control the VFD 14 in a normal mode to operate the motor at a select reference frequency, and to control the VFD 14 in a negative motor torque mode to operate the motor at a higher frequency than the select reference frequency, whereby the control unit 16 prevents the motor 18 from entering a negative slip condition. Predicting occurrence of a negative motor torque condition comprises determining if motor torque has a negative slope and motor torque is less than a select torque reference amount. Controlling the VFD 14 to operate the motor 18 at a higher frequency than the select reference frequency comprises continually incrementally increasing an output frequency as long as negative torque condition is predicted.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. A control method for overvoltage suppression of a variable frequency drive (VFD) operating a motor to drive a reciprocating load, comprising:
   controlling the VFD to operate the motor at a select reference frequency;
   predicting occurrence of a negative motor torque condition; and
   in response to a predicted negative torque condition controlling the VFD to operate the motor at a higher frequency than the select reference frequency.

2. The control method of claim 1 wherein controlling the VFD to operate the motor at a higher frequency than the select reference frequency comprises continually incrementally increasing an output frequency as long as negative torque condition is predicted.

3. The control method of claim 1 wherein predicting occurrence of a negative motor torque condition comprises determining if motor torque has a negative slope.

4. The control method of claim 1 wherein predicting occurrence of a negative motor torque condition comprises determining if motor torque has a negative slope and motor torque is less than a select torque reference amount.

5. The control method of claim 3 wherein magnitude of the higher frequency is dependent on value of negative slope.

6. The control method of claim 1 further comprising determining if the higher frequency is greater than a maximum frequency and in response thereto providing a shutdown condition.

7. A control for overvoltage suppression of a variable frequency drive (VFD) operating a motor to drive a reciprocating load, comprising:
   a control unit adapted to control the VFD in a normal mode to operate the motor at a select reference frequency, and to control the VFD in a negative motor torque mode to operate the motor at a higher frequency than the select reference frequency, whereby the control unit prevents the motor from entering a negative slip condition.

8. The control of claim 7 wherein the control unit in the negative torque mode continually incrementally increases an output frequency.

9. The control of claim 7 further comprising means for determining motor torque and wherein the control unit operates in the negative torque mode if motor torque has a negative slope.

10. The control of claim 7 further comprising means for determining motor torque and wherein the control unit operates in the negative torque mode if motor torque has a negative slope and motor torque is less than a select torque reference amount.

11. The control of claim 10 wherein magnitude of the higher frequency is dependent on value of negative slope.

12. The control of claim 7 wherein the control unit determines if the higher frequency is greater than a maximum frequency and in response thereto enters a shutdown condition.

13. A motor control for a reciprocating load including overvoltage suppression, comprising:
 a variable frequency drive (VFD) operatively connected to a power source for operating a motor to drive the reciprocating load;
 means for determining motor torque; and
 a control unit connected to the VFD and to the determining means and adapted to control the VFD in a normal mode to operate the motor at a select reference frequency, and to predict occurrence of a negative motor torque condition based on sensed motor torque and in response to a negative motor torque condition controlling the VFD in a negative motor torque mode to operate the motor at a higher frequency than the select reference frequency to prevent the motor from entering a negative slip condition.

14. The motor control of claim 13 wherein the control unit in the negative torque mode continually incrementally increases an output frequency as long as the negative motor torque condition is predicted.

15. The motor control of claim 13 further comprising means for determining motor torque and wherein the control unit operates in the negative torque mode if motor torque has a negative slope.

16. The motor control of claim 13 further comprising means for determining motor torque and wherein the control unit operates in the negative torque mode if motor torque has a negative slope and motor torque is less than a select torque reference amount.

17. The motor control of claim 16 wherein magnitude of the higher frequency is dependent on value of negative slope.

18. The motor control of claim 13 wherein the control unit determines if the higher frequency is greater than a maximum frequency and in response thereto enters a shutdown condition.

* * * * *